US012571323B2

(12) United States Patent

Ajalli et al.

(10) Patent No.: US 12,571,323 B2

(45) Date of Patent: Mar. 10, 2026

(54) TURBINE ENGINE AIRFOIL

(71) Applicant: Pratt & Whitney Canada Corp., Longueuil (CA)

(72) Inventors: Fariba Ajalli, Longueuil (CA); Panagiota Tsifourdaris, Montreal (CA); Lorenzo Sanzari, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 86 days.

(21) Appl. No.: 18/744,180

(22) Filed: Jun. 14, 2024

(65) Prior Publication Data

US 2025/0382890 A1 Dec. 18, 2025

(51) Int. Cl.
*F01D 9/04* (2006.01)
*F01D 5/14* (2006.01)

(52) U.S. Cl.
CPC ............. *F01D 9/041* (2013.01); *F01D 5/141* (2013.01); *F05D 2250/74* (2013.01)

(58) Field of Classification Search
CPC ....... F01D 9/041; F01D 5/141; F05D 2250/74
See application file for complete search history.

(56) References Cited

U.S. PATENT DOCUMENTS 7,367,779 B2 5/2008 Girgis
7,387,490 B2 6/2008 Noera
7,390,165 B2 6/2008 Francini
7,559,749 B2 7/2009 Kidikian
7,568,890 B2 8/2009 Findlay
7,625,183 B2 12/2009 Tsifourdaris
11,098,598 B1 8/2021 Monastero
11,466,573 B1 10/2022 Balzer
11,512,595 B1 11/2022 Ajalli
11,572,790 B1 * 2/2023 Marini .................... F01D 5/288
11,578,602 B1 * 2/2023 Ajalli ....................... F01D 5/141
11,578,608 B1 * 2/2023 Marini .................... F01D 5/288
11,603,763 B1 * 3/2023 Twahir .................... F01D 5/141
11,867,081 B1 1/2024 Twahir
2020/0232328 A1 * 7/2020 Song ..................... F04D 29/324

* cited by examiner

*Primary Examiner* — Ted Kim
(74) *Attorney, Agent, or Firm* — Getz Balich LLC

(57) ABSTRACT

An airfoil for a turbine engine includes a first end, a second end, a leading edge, a trailing edge, a pressure side and a suction side. The leading edge and the trailing edge are joined by the pressure side and the suction side to provide an exterior airfoil surface extending in a spanwise direction from the first end of the airfoil to the second end of the airfoil. The exterior airfoil surface is formed in conformance with a plurality of cross-section profiles of the airfoil described by a set of Cartesian coordinates set forth in Table 1. The Cartesian coordinates are provided by an axial coordinate scaled by a local axial chord, a circumferential coordinate scaled by the local axial chord, and a span location. The local axial chord corresponds to a width of the airfoil between the leading edge and the trailing edge at the span location.

20 Claims, 5 Drawing Sheets

TURBINE ENGINE AIRFOIL

TECHNICAL FIELD

This disclosure relates generally to a turbine engine and, more particularly, to an airfoil for the turbine engine.

BACKGROUND INFORMATION

A turbine section in a gas turbine engine typically includes one or more stator vane arrays for conditioning (e.g., guiding, turning, etc.) combustion products flowing through a flowpath. Various airfoil designs are known in the art for such turbine stator vane array applications. While these known airfoil designs have various benefits, there is still room in the art for improvement.

SUMMARY

According to an aspect of the present disclosure, an apparatus is provided for a turbine engine. This apparatus includes an airfoil, and the airfoil includes a first end, a second end, a leading edge, a trailing edge, a pressure side and a suction side. The leading edge and the trailing edge are joined by the pressure side and the suction side to provide an exterior airfoil surface extending in a spanwise direction from the first end of the airfoil to the second end of the airfoil. The exterior airfoil surface is formed in conformance with a plurality of cross-section profiles of the airfoil described by a set of Cartesian coordinates set forth in Table 1. The Cartesian coordinates are provided by an axial coordinate scaled by a local axial chord, a circumferential coordinate scaled by the local axial chord, and a span location. The local axial chord corresponds to a width of the airfoil between the leading edge and the trailing edge at the span location.

According to another aspect of the present disclosure, a stator vane structure is provided for a turbine engine. This stator vane structure includes a first platform, a second platform and a plurality of stator vanes arranged circumferentially about an axis in an array. Each of the stator vanes includes an airfoil. The airfoil includes a leading edge, a trailing edge, a pressure side and a suction side. The leading edge and the trailing edge are joined by the pressure side and the suction side to provide an exterior airfoil surface extending in a spanwise direction from the first platform to the second platform. The exterior airfoil surface is formed in conformance with a plurality of cross-section profiles of the airfoil defined by a set of Cartesian coordinates set forth in Table 1. The Cartesian coordinates are provided by an axial coordinate scaled by a local axial chord, a circumferential coordinate scaled by the local axial chord, and a span location. The local axial chord corresponds to a width of the airfoil between the leading edge and the trailing edge at the span location.

According to still another aspect of the present disclosure, a turbine engine is provided that include a flowpath, a compressor section, a combustor section and a turbine section. The flowpath extends through the compressor section, the combustor section and the turbine section from an inlet into the flowpath to an exhaust from the flowpath. The turbine section includes a plurality of turbine vanes arranged circumferentially about an axis in an array. Each of the turbine vanes includes an airfoil located in the flowpath. The airfoil includes a first end, a second end, a leading edge, a trailing edge, a pressure side and a suction side. The leading edge and the trailing edge are joined by the pressure side and the suction side to provide an exterior airfoil surface extending in a spanwise direction from the first end of the airfoil to the second end of the airfoil. The exterior airfoil surface is formed in conformance with a plurality of cross-section profiles of the airfoil defined by a set of Cartesian coordinates set forth in Table 1. The Cartesian coordinates are provided by an axial coordinate scaled by a local axial chord, a circumferential coordinate scaled by the local axial chord, and a span location. The local axial chord corresponds to a width of the airfoil between the leading edge and the trailing edge at the span location.

The turbine section may include a high pressure turbine section and a low pressure turbine section. The low pressure turbine section may include the turbine vanes.

The turbine vanes may be part of a first stage of the low pressure turbine section.

The set of Cartesian coordinates set forth in the Table 1 may have a tolerance of +/−0.050 inches.

The turbine engine may also include a coating applied over the exterior airfoil surface.

The set of Cartesian coordinates set forth in the Table 1 may have a tolerance of +/−0.050 inches.

The span location may correspond to a distance from the axis.

The stator vanes may be turbine vanes.

The exterior airfoil surface may be partially or completely covered by a coating.

The stator vanes may only include forty stator vanes.

The set of Cartesian coordinates set forth in the Table 1 may have a tolerance of +/−0.050 inches.

The span location may correspond to a distance from a rotational axis of the turbine engine.

The apparatus may also include an inner platform and an outer platform. The inner platform may be connected to the airfoil at the first end of the airfoil. The outer platform may be connected to the airfoil at the second end of the airfoil.

The apparatus may be configured as or otherwise include a turbine vane.

The turbine vane may be a low pressure turbine vane.

The apparatus may also include a coating applied over the exterior airfoil surface.

The airfoil may be configured without an internal cooling passage.

The airfoil may be one of forty airfoils arranged circumferentially about an axis in an annular array.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
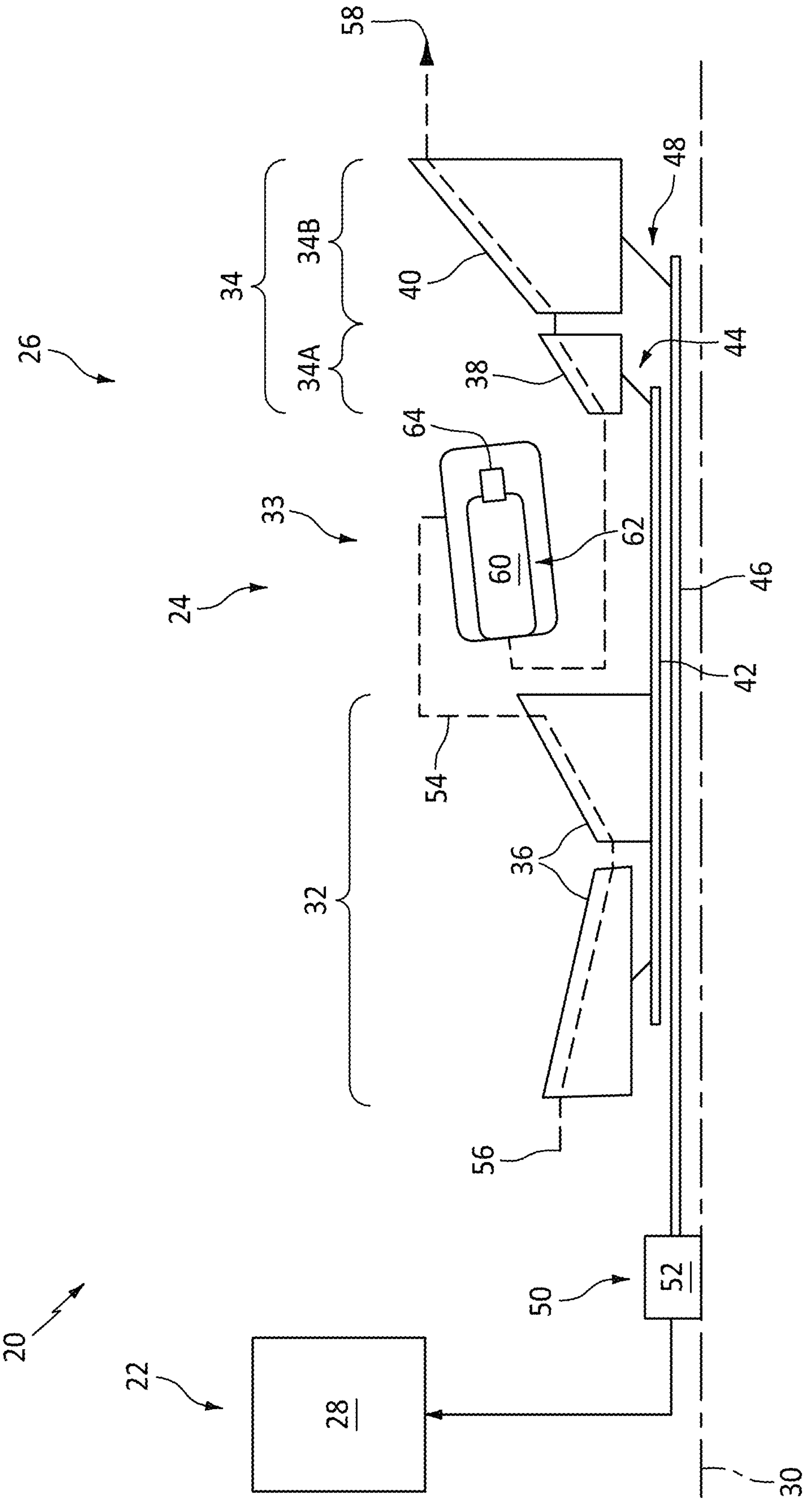
FIG. 1 is a schematic illustration of an aircraft powerplant.

FIG. 1 illustrates a powerplant 20 for an aircraft. The aircraft may be a helicopter, an airplane, a drone (e.g., an unmanned aerial vehicle (UAV)) or any other manned or unmanned aerial vehicle or system. The powerplant 20 may be configured as, or otherwise included as part of, a propulsion and/or lift system for the aircraft. The powerplant 20 may also or alternatively be configured as, or otherwise included as part of, an electrical power system for the aircraft. The present disclosure, however, is not limited to aircraft applications. The powerplant 20, for example, may alternatively be configured as, or otherwise included as part of, an electrical power system for ground-based operation (e.g., an industrial powerplant), or otherwise. However, for ease of description, the powerplant 20 is described below as an aircraft powerplant.

The aircraft powerplant 20 of FIG. 1 includes a mechanical load 22 and a core 24 of a gas turbine engine 26, where the engine core 24 is configured to power operation of the mechanical load 22. The mechanical load 22 may be configured as or otherwise include a rotor 28 mechanically driven by the engine core 24. This driven rotor 28 may be a bladed propulsor rotor for the aircraft propulsion and/or lift system. The propulsor rotor may be an open propulsor rotor (e.g., an un-ducted propulsor rotor) or a ducted propulsor rotor. For example, where the turbine engine 26 is a turboshaft engine, the open propulsor rotor may be a rotorcraft rotor such as a helicopter main rotor or a helicopter tail rotor. Where the turbine engine 26 is a turboprop engine, the open propulsor rotor may be a propeller rotor. Where the turbine engine 26 is a turbofan engine, the ducted propulsor rotor may be a fan rotor. Alternatively, the driven rotor 28 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary turbine engines. The turbine engine 26, for example, may alternatively be configured as a turbojet engine, a propfan engine, a pusher fan engine or any other type of turbine engine operable to power the operation of the mechanical load 22.

The turbine engine 26 extends axially along an axis 30 from a forward, upstream end of the turbine engine 26 to an aft, downstream end of the turbine engine 26. Briefly, this axis 30 may be a centerline axis of the turbine engine 26 and/or its engine core 24. The axis 30 may also be a rotational axis of one or more members of the turbine engine 26 and its engine core 24. The turbine engine 26 of FIG. 1 includes a compressor section 32, a combustor section 33 and a turbine section 34. The turbine section 34 of FIG. 1 includes a high pressure turbine (HPT) section 34A and a low pressure turbine (LPT) section 34B, which LPT section 34B of FIG. 1 is a power turbine (PT) section for powering operation of the mechanical load 22.

The compressor section 32 includes a compressor rotor 36. The HPT section 34A includes a high pressure turbine (HPT) rotor 38. The LPT section 34B includes a low pressure turbine (LPT) rotor 40. The compressor rotor 36, the HPT rotor 38 and the LPT rotor 40 each respectively include one or more arrays (e.g., stages) of rotor blades, where the rotor blades in each array are arranged circumferentially around and are connected to a respective rotor disk or hub. The rotor blades in each array, for example, may be formed integral with or mechanically fastened, welded, brazed and/or otherwise attached to the respective rotor disk and/or hub.

The compressor rotor 36 is coupled to and rotatable with the HPT rotor 38. The compressor rotor 36 of FIG. 1, for example, is connected to the HPT rotor 38 by a high speed shaft 42. At least (or only) the compressor rotor 36, the HPT rotor 38 and the high speed shaft 42 collectively form a high speed rotating assembly 44; e.g., a high speed spool of the turbine engine 26. The LPT rotor 40 of FIG. 1 is connected to a low speed shaft 46. At least (or only) the LPT rotor 40 and the low speed shaft 46 collectively form a low speed rotating assembly 48; e.g., a low speed spool/a power turbine spool of the turbine engine 26. This low speed rotating assembly 48 is further coupled to the driven rotor 28 through a drivetrain 50. This drivetrain 50 may be configured as a geared drivetrain, where a geartrain 52 (e.g., a transmission, a speed change device, an epicyclic geartrain, etc.) is disposed between and operatively couples the driven rotor 28 to the low speed rotating assembly 48 and its LPT rotor 40. With this arrangement, the driven rotor 28 may rotate at a different (e.g., slower) rotational velocity than the low speed rotating assembly 48 and its LPT rotor 40. However, the drivetrain 50 may alternatively be configured as a direct drive drivetrain, where the geartrain 52 is omitted. With such an arrangement, the driven rotor 28 may rotate at a common (the same) rotational velocity as the low speed rotating assembly 48 and its LPT rotor 40. Referring again to FIG. 1, each of the rotating assemblies 44, 48 and its members may be rotatable about the axis 30, and the axis 30 may be a centerline axis of each of the rotating assemblies 44, 48 and its members.

The turbine engine 26 of FIG. 1 includes a (e.g., annular) core flowpath 54. The core flowpath 54 extends longitudinally within the turbine engine 26 and its engine core 24 from an airflow inlet 56 into the core flowpath 54 to a combustion products exhaust 58 from the core flowpath 54. More particularly, the core flowpath 54 extends from the core inlet 56, sequentially through the compressor section 32, the combustor section 33, the HPT section 34A and the LPT section 34B, to the core exhaust 58.

During operation of the turbine engine 26, air is directed into the engine core 24 through the core inlet 56. This air entering the core flowpath 54 may be referred to as core air. This core air is compressed by the compressor rotor 36 and directed into a combustion chamber 60 (e.g., an annular combustion chamber) within a combustor 62 (e.g., an annular combustor) of the combustor section 33. Fuel is injected into the combustion chamber 60 by one or more fuel injectors 64 and mixed with the compressed core air to provide a fuel-air mixture. This fuel-air mixture is ignited and combustion products thereof flow through and sequentially drive rotation of the HPT rotor 38 and the LPT rotor 40. The rotation of the HPT rotor 38 drives rotation of the compressor rotor 36 and, thus, the compression of the air received from the core inlet 56. The rotation of the LPT rotor 40 drives rotation of the driven rotor 28. Where the driven rotor 28 is configured as the propulsor rotor, the rotation of this propulsor rotor propels additional air (e.g., outside of the engine core 24 and its core flowpath 54) to provide aircraft thrust and/or aircraft lift. Where the driven rotor 28 is configured as the generator rotor, the rotation of this generator rotor may facilitate generation of electricity.

Figure 2:
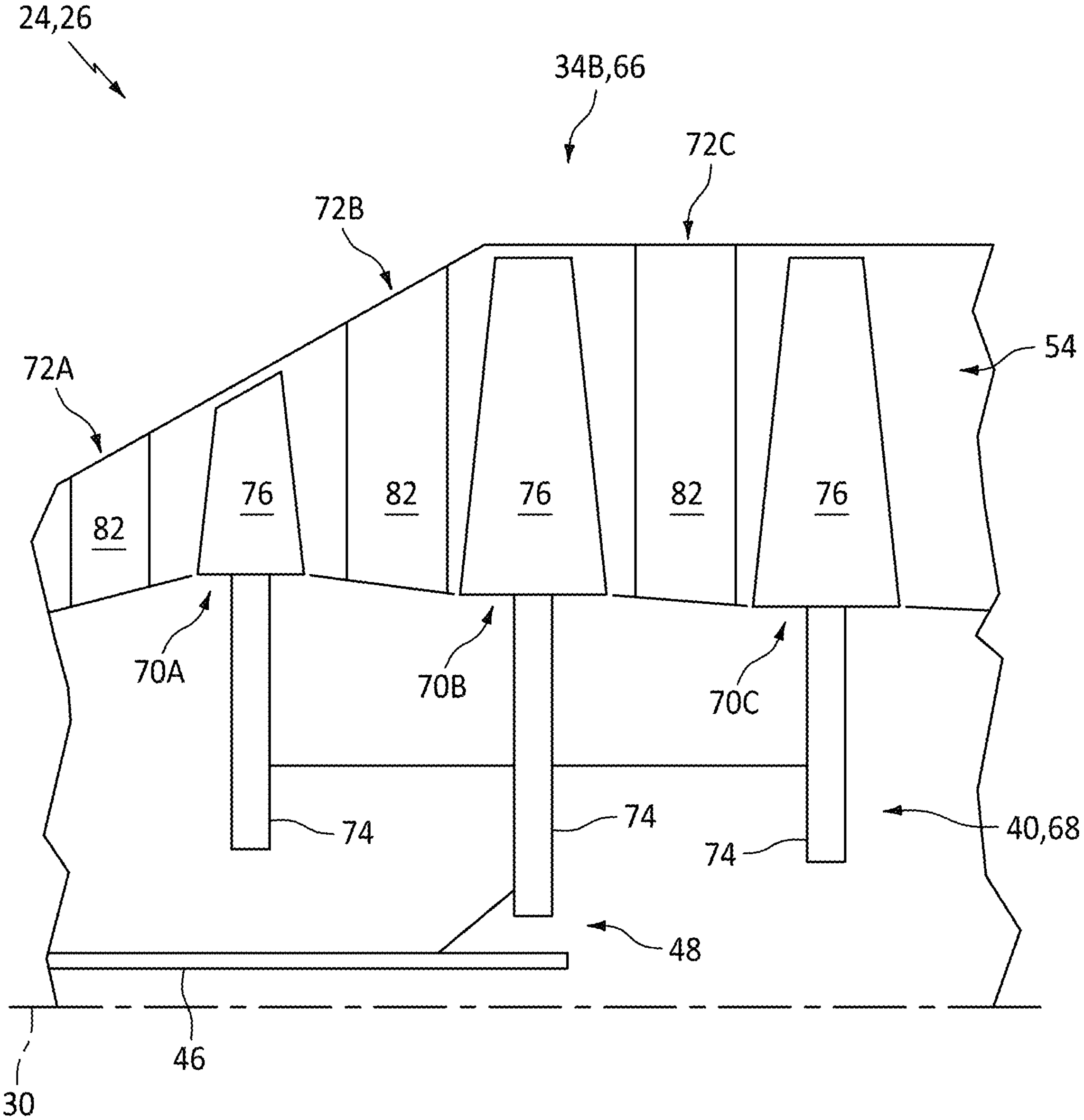
FIG. 2 is a partial side schematic illustration of a turbine section in the aircraft powerplant.

FIG. 2 illustrates a section 66 of the turbine engine 26. For ease of description, this engine section 66 is described below as the LPT section 34B in the turbine engine 26. However, it is contemplated the engine section 66 may alternatively be the HPT section 34A in the turbine engine 26.

The engine section 66 of FIG. 2 includes an engine rotor 68 (e.g., the LPT rotor 40) with a plurality of rotor stages 70A-C (generally referred to as "70"). This engine section 66 also includes a plurality of stator vane structures 72A-C (generally referred to as "72") interspersed with the rotor stages 70. The first stator vane structure 72A of FIG. 2, for example, is located longitudinally next to and upstream of the first rotor stage 70A. The second stator vane structure 72B is located longitudinally next to and between the first rotor stage 70A and the second rotor stage 70B. The third stator vane structure is located longitudinally next to and between the second rotor stage 70B and the third rotor stage 70C. Here, the engine section 66 is shown as a three-stage section of the turbine engine 26; e.g., a three-stage LPT section 34B. It is contemplated, however, the engine section 66 and its engine rotor 68 may alternatively be configured with a single stage, two stages or more than three stages.

Each rotor stage 70 includes a rotor disk 74 and a plurality of rotor blades 76 connected to the rotor disk 74. The rotor blades 76 are arranged circumferentially about the rotor disk 74 and the axis 30 in an annular array. Each of these rotor blades 76 projects spanwise (e.g., radially) out from the rotor disk 74 into the core flowpath 54.

Figure 3:
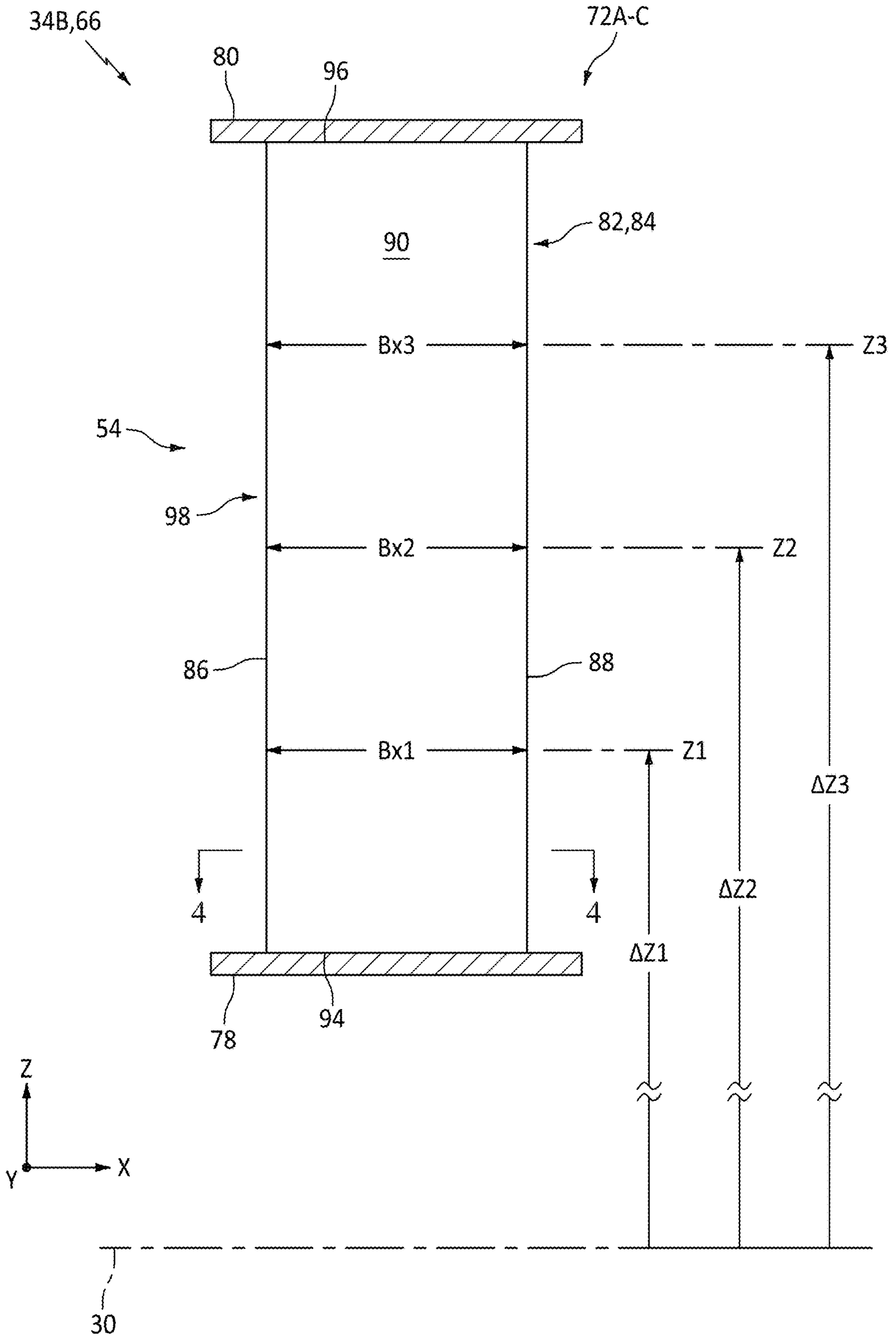
FIG. 3 is a partial sectional schematic illustration of a turbine stator vane structure.

Referring to FIG. 3, each stator vane structure 72 includes an inner platform 78, an outer platform 80 and a plurality of stator vanes 82; e.g., low pressure turbine (LPT) vanes. The inner platform 78 extends longitudinally along the core flowpath 54 and axially along the axis 30. The inner platform 78 extends circumferentially around the axis 30, thereby providing the inner platform 78 with a full-hoop (e.g., tubular) geometry. This inner platform 78 forms an inner peripheral boundary of the core flowpath 54 longitudinally across the respective stator vane structure 72. The outer platform 80 is spaced radially outboard from the inner platform 78. The outer platform 80 extends longitudinally along the core flowpath 54 and axially along the axis 30. The outer platform 80 extends circumferentially around the axis 30, thereby providing the outer platform 80 with a full-hoop (e.g., tubular) geometry. This outer platform 80 forms an outer peripheral boundary of the core flowpath 54 longitudinally across the respective stator vane structure 72. The stator vanes 82 are arranged circumferentially about the axis 30 in an annular array. These stator vanes 82 are disposed between and connected to (e.g., formed integral with or attached to) the inner platform 78 and the outer platform 80. Each stator vane 82 extends spanwise (e.g., radially) across the core flowpath 54 from the inner platform 78 to the outer platform 80. With such an arrangement, referring to FIG. 2, each stator vane structure 72 is configured to condition (e.g., guide, turn, etc.) air being discharged from a respective rotor stage 70 and/or condition (e.g., guide, turn, etc.) air being directed to a respective rotor stage 70.

Figure 4:
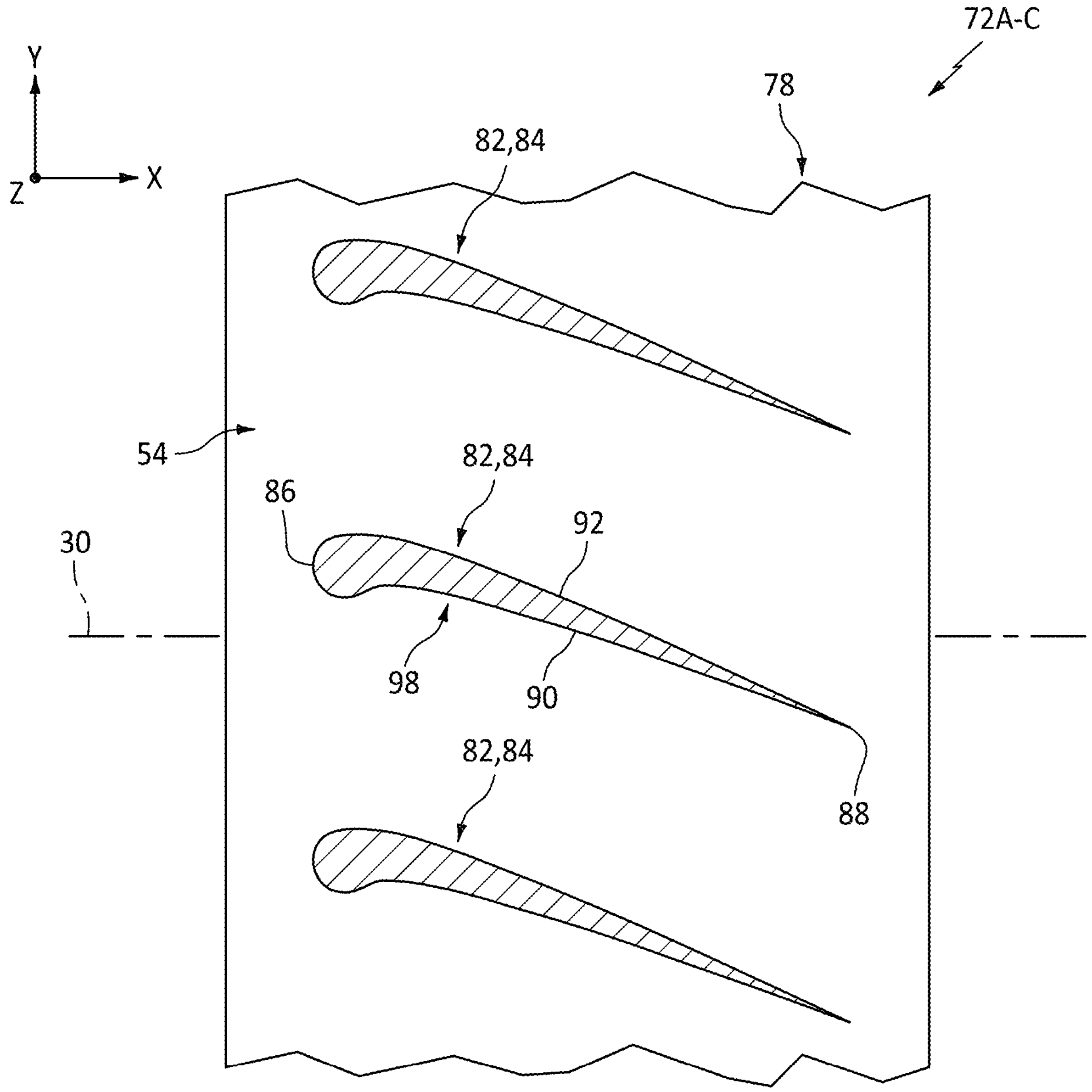
FIG. 4 is a partial sectional schematic illustration of the turbine stator vane structure taken along line 4-4 in FIG. 3.
Figure 5:
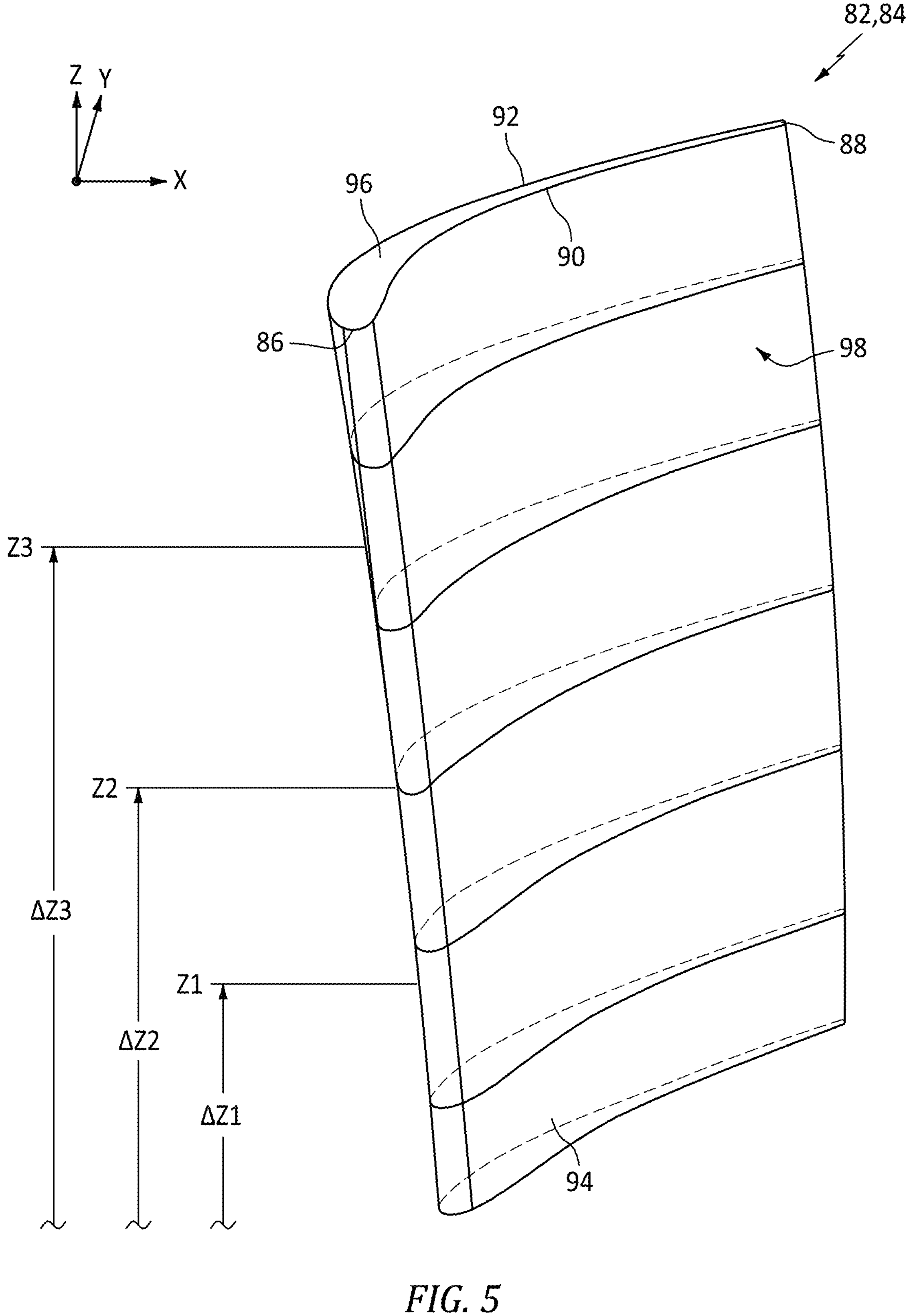
FIG. 5 is a perspective illustration of a turbine stator vane airfoil.

Referring to FIG. 4, each stator vane 82 comprises an airfoil 84; e.g., a turbine vane airfoil. This airfoil 84 extends chordwise from an upstream leading edge 86 of the airfoil 84 to a downstream trailing edge 88 of the airfoil 84. The airfoil 84 extends laterally from a concave pressure side 90 of the airfoil 84 to a convex suction side 92 of the airfoil 84. The pressure side 90 and the suction side 92 extend chordwise between and meet at the leading edge 86 and the trailing edge 88. Referring to FIG. 5, each airfoil member 86, 88, 90 and 92 extends spanwise (e.g., radially) from a base end 94 of the airfoil 84 to a tip end 96 of the airfoil 84. Referring to FIG. 3, the airfoil 84 is connected to the inner platform 78 at (e.g., on, adjacent or proximate) the base end 94. The airfoil 84 is connected to the outer platform 80 at the tip end 96. The airfoil 84 is thereby provided with an exterior airfoil surface 98 which extends spanwise from the base end 94/the inner platform 78 to the tip end 96/the outer platform 80. This exterior airfoil surface 98 is formed by the leading edge 86, the trailing edge 88, the pressure side 90 and the suction side 92 of the airfoil 84. The exterior airfoil surface 98 guides the combustion products flowing through the core flowpath 54.

Referring to FIG. 3, a geometry of the exterior airfoil surface 98 is described below in terms of Cartesian coordinates defined along an x-axis, a y-axis and z-axis. The x-axis may be an axial direction parallel to the axis 30. The y-axis may be a circumferential direction about the axis 30 (see also FIG. 4), where the y-axis is perpendicular to the x-axis. The z-axis may be a radial direction out from the axis 30, where the z-axis is perpendicular to the x-axis and the y-axis. More particularly, the geometry of the exterior airfoil surface 98 is formed in conformance with a plurality of cross-section profiles of the airfoil 84 as described by a set of the Cartesian coordinates set forth in Table 1 below. In the Table 1, the cross-section profiles are provided for three spanwise positions Z1-Z3 (e.g., z-coordinates) along the airfoil 84. The Z1 position is at a one-quarter (¼) span location up from the base end 94/the inner platform 78 along the z-axis, where the span coordinate (ΔZ1) is the radial distance from the axis 30 to the Z1 position. The Z2 position is at a one-half (½) span location up from the base end 94/the inner platform 78 along the z-axis, where the span coordinate (ΔZ2) is the radial distance from the axis 30 to the Z2 position. The Z3 position is at a three-quarters (¾) span location up from the base end 94/the inner platform 78 along the z-axis, where the span coordinate (ΔZ3) is the radial distance from the axis 30 to the Z3 position.

The axial coordinates (x) and the circumferential coordinates (y) in the Table 1 for each of the cross-section profiles are normalized by a local axial chord (Bx) for the cross-section profiles at the respective span coordinate (ΔZ1, ΔZ2, ΔZ3). By way of example, the local axial chord (Bx1) for the axial coordinates (x) and the circumferential coordinates (y) associated with the one-quarter span coordinate (ΔZ1) corresponds to a width of the airfoil 84 between the leading edge 86 and the trailing edge 88 at the one-quarter (¼) span location Z1.

The axial coordinates (x) and the circumferential coordinates (y) in the Table 1 for each of the cross-section profiles at the respective span coordinate (ΔZ1, ΔZ2, ΔZ3) describe a contour of the exterior airfoil surface 98 at that respective span coordinate (ΔZ1, ΔZ2, ΔZ3). This contour of the exterior airfoil surface 98 is formed by joining adjacent points in the Table 1 in a smooth manner within the x-y plane. The three-dimensional exterior airfoil surface 98 is formed by joining adjacent cross-section profiles in a smooth manner along the span—the z-axis. The manufacturing tolerance relative to the specified coordinates is +/−0.050 inches (+/−1.27 millimeters). The coordinates in the Table 1 define points on a cold, uncoated, stationary airfoil surface, in a plane at the corresponding span location. However, the airfoil 84 and its exterior airfoil surface 98 may be coated after manufacture. Here, additional elements such as one or more cooling holes, protective coatings, fillets, seal structures and/or the like may also be formed by, in and/or onto the exterior airfoil surface 98 in other embodiments; but, these additional elements may not be defined by the normalized coordinates in the Table 1.

TABLE 1

| REFERENCE RADIUS: ΔZ1<br>SECTION COORDINATES (X, Y)/B × 1 | |
|---|---|
| 0.000 | 0.304 |
| 0.001 | 0.308 |

TABLE 1-continued

| | |
|---|---|
| 0.005 | 0.315 |
| 0.012 | 0.322 |
| 0.021 | 0.326 |
| 0.031 | 0.328 |
| 0.042 | 0.329 |
| 0.055 | 0.327 |
| 0.075 | 0.325 |
| 0.100 | 0.321 |
| 0.125 | 0.316 |
| 0.150 | 0.310 |
| 0.175 | 0.302 |
| 0.200 | 0.293 |
| 0.225 | 0.283 |
| 0.250 | 0.271 |
| 0.275 | 0.259 |
| 0.300 | 0.244 |
| 0.325 | 0.229 |
| 0.350 | 0.212 |
| 0.375 | 0.194 |
| 0.400 | 0.175 |
| 0.425 | 0.155 |
| 0.450 | 0.133 |
| 0.475 | 0.110 |
| 0.500 | 0.086 |
| 0.525 | 0.060 |
| 0.550 | 0.034 |
| 0.575 | 0.007 |
| 0.600 | −0.021 |
| 0.625 | −0.050 |
| 0.650 | −0.081 |
| 0.675 | −0.112 |
| 0.700 | −0.144 |
| 0.725 | −0.177 |
| 0.750 | −0.212 |
| 0.775 | −0.247 |
| 0.800 | −0.283 |
| 0.825 | −0.320 |
| 0.850 | −0.358 |
| 0.875 | −0.398 |
| 0.900 | −0.438 |
| 0.925 | −0.479 |
| 0.943 | −0.509 |
| 0.958 | −0.535 |
| 0.971 | −0.558 |
| 0.981 | −0.575 |
| 0.987 | −0.585 |
| 0.992 | −0.594 |
| 0.996 | −0.601 |
| 0.999 | −0.606 |
| 1.000 | −0.611 |
| 0.999 | −0.617 |
| 0.996 | −0.622 |
| 0.992 | −0.625 |
| 0.987 | −0.627 |
| 0.981 | −0.627 |
| 0.971 | −0.620 |
| 0.958 | −0.600 |
| 0.943 | −0.576 |
| 0.925 | −0.549 |
| 0.900 | −0.510 |
| 0.875 | −0.471 |
| 0.850 | −0.433 |
| 0.825 | −0.396 |
| 0.800 | −0.360 |
| 0.775 | −0.326 |
| 0.750 | −0.293 |
| 0.725 | −0.261 |
| 0.700 | −0.231 |
| 0.675 | −0.203 |
| 0.650 | −0.176 |
| 0.625 | −0.151 |
| 0.600 | −0.127 |
| 0.575 | −0.104 |
| 0.550 | −0.082 |
| 0.525 | −0.061 |
| 0.500 | −0.041 |
| 0.475 | −0.022 |
| 0.450 | −0.004 |
| 0.425 | 0.012 |
| 0.400 | 0.029 |

TABLE 1-continued

| | |
|---|---|
| 0.375 | 0.045 |
| 0.350 | 0.061 |
| 0.325 | 0.077 |
| 0.300 | 0.092 |
| 0.275 | 0.106 |
| 0.250 | 0.121 |
| 0.225 | 0.136 |
| 0.200 | 0.150 |
| 0.175 | 0.165 |
| 0.150 | 0.179 |
| 0.125 | 0.194 |
| 0.100 | 0.210 |
| 0.075 | 0.226 |
| 0.055 | 0.239 |
| 0.042 | 0.247 |
| 0.031 | 0.255 |
| 0.021 | 0.263 |
| 0.012 | 0.271 |
| 0.005 | 0.281 |
| 0.001 | 0.290 |

| REFERENCE RADIUS: ΔZ2 SECTION COORDINATES (X, Y)/B × 2 | |
|---|---|
| 0.000 | 0.306 |
| 0.001 | 0.314 |
| 0.005 | 0.320 |
| 0.012 | 0.327 |
| 0.021 | 0.332 |
| 0.031 | 0.335 |
| 0.042 | 0.335 |
| 0.055 | 0.336 |
| 0.075 | 0.336 |
| 0.100 | 0.334 |
| 0.125 | 0.331 |
| 0.150 | 0.327 |
| 0.175 | 0.322 |
| 0.200 | 0.315 |
| 0.225 | 0.307 |
| 0.250 | 0.297 |
| 0.275 | 0.286 |
| 0.300 | 0.274 |
| 0.325 | 0.260 |
| 0.350 | 0.245 |
| 0.375 | 0.229 |
| 0.400 | 0.211 |
| 0.425 | 0.191 |
| 0.450 | 0.171 |
| 0.475 | 0.148 |
| 0.500 | 0.125 |
| 0.525 | 0.100 |
| 0.550 | 0.074 |
| 0.575 | 0.046 |
| 0.600 | 0.017 |
| 0.625 | −0.012 |
| 0.650 | −0.043 |
| 0.675 | −0.075 |
| 0.700 | −0.109 |
| 0.725 | −0.144 |
| 0.750 | −0.180 |
| 0.775 | −0.217 |
| 0.800 | −0.256 |
| 0.825 | −0.296 |
| 0.850 | −0.338 |
| 0.875 | −0.380 |
| 0.900 | −0.424 |
| 0.925 | −0.470 |
| 0.943 | −0.503 |
| 0.958 | −0.532 |
| 0.971 | −0.557 |
| 0.981 | −0.576 |
| 0.987 | −0.588 |
| 0.992 | −0.598 |
| 0.996 | −0.605 |
| 0.999 | −0.611 |
| 1.000 | −0.616 |
| 0.999 | −0.622 |
| 0.996 | −0.627 |
| 0.992 | −0.630 |
| 0.987 | −0.632 |

TABLE 1-continued

| | |
|---|---|
| 0.981 | −0.632 |
| 0.971 | −0.624 |
| 0.958 | −0.603 |
| 0.943 | −0.577 |
| 0.925 | −0.548 |
| 0.900 | −0.507 |
| 0.875 | −0.468 |
| 0.850 | −0.430 |
| 0.825 | −0.393 |
| 0.800 | −0.358 |
| 0.775 | −0.324 |
| 0.750 | −0.291 |
| 0.725 | −0.260 |
| 0.700 | −0.230 |
| 0.675 | −0.202 |
| 0.650 | −0.175 |
| 0.625 | −0.149 |
| 0.600 | −0.124 |
| 0.575 | −0.100 |
| 0.550 | −0.077 |
| 0.525 | −0.055 |
| 0.500 | −0.034 |
| 0.475 | −0.014 |
| 0.450 | 0.005 |
| 0.425 | 0.024 |
| 0.400 | 0.043 |
| 0.375 | 0.061 |
| 0.350 | 0.078 |
| 0.325 | 0.095 |
| 0.300 | 0.111 |
| 0.275 | 0.127 |
| 0.250 | 0.142 |
| 0.225 | 0.157 |
| 0.200 | 0.171 |
| 0.175 | 0.186 |
| 0.150 | 0.200 |
| 0.125 | 0.213 |
| 0.100 | 0.227 |
| 0.075 | 0.240 |
| 0.055 | 0.251 |
| 0.042 | 0.258 |
| 0.031 | 0.264 |
| 0.021 | 0.271 |
| 0.012 | 0.279 |
| 0.005 | 0.288 |
| 0.001 | 0.296 |
| REFERENCE RADIUS: ΔZ3<br>SECTION COORDINATES (X, Y)/B × 3 | |
| 0.000 | 0.313 |
| 0.001 | 0.323 |
| 0.005 | 0.330 |
| 0.012 | 0.337 |
| 0.021 | 0.342 |
| 0.031 | 0.345 |
| 0.042 | 0.346 |
| 0.055 | 0.348 |
| 0.075 | 0.349 |
| 0.100 | 0.350 |
| 0.125 | 0.349 |
| 0.150 | 0.347 |
| 0.175 | 0.343 |
| 0.200 | 0.338 |
| 0.225 | 0.332 |
| 0.250 | 0.324 |
| 0.275 | 0.315 |
| 0.300 | 0.305 |
| 0.325 | 0.293 |
| 0.350 | 0.279 |
| 0.375 | 0.264 |
| 0.400 | 0.248 |
| 0.425 | 0.230 |
| 0.450 | 0.211 |
| 0.475 | 0.190 |
| 0.500 | 0.167 |
| 0.525 | 0.143 |
| 0.550 | 0.118 |
| 0.575 | 0.090 |
| 0.600 | 0.062 |

TABLE 1-continued

| | |
|---|---|
| 0.625 | 0.032 |
| 0.650 | 0.000 |
| 0.675 | −0.032 |
| 0.700 | −0.066 |
| 0.725 | −0.102 |
| 0.750 | −0.140 |
| 0.775 | −0.179 |
| 0.800 | −0.220 |
| 0.825 | −0.263 |
| 0.850 | −0.307 |
| 0.875 | −0.354 |
| 0.900 | −0.401 |
| 0.925 | −0.451 |
| 0.943 | −0.488 |
| 0.958 | −0.520 |
| 0.971 | −0.547 |
| 0.981 | −0.569 |
| 0.987 | −0.582 |
| 0.992 | −0.592 |
| 0.996 | −0.601 |
| 0.999 | −0.607 |
| 1.000 | −0.613 |
| 0.999 | −0.618 |
| 0.996 | −0.623 |
| 0.992 | −0.627 |
| 0.987 | −0.628 |
| 0.981 | −0.628 |
| 0.971 | −0.620 |
| 0.958 | −0.597 |
| 0.943 | −0.569 |
| 0.925 | −0.538 |
| 0.900 | −0.495 |
| 0.875 | −0.454 |
| 0.850 | −0.415 |
| 0.825 | −0.377 |
| 0.800 | −0.341 |
| 0.775 | −0.306 |
| 0.750 | −0.273 |
| 0.725 | −0.241 |
| 0.700 | −0.210 |
| 0.675 | −0.180 |
| 0.650 | −0.152 |
| 0.625 | −0.125 |
| 0.600 | −0.098 |
| 0.575 | −0.073 |
| 0.550 | −0.049 |
| 0.525 | −0.025 |
| 0.500 | −0.002 |
| 0.475 | 0.018 |
| 0.450 | 0.039 |
| 0.425 | 0.059 |
| 0.400 | 0.078 |
| 0.375 | 0.096 |
| 0.350 | 0.113 |
| 0.325 | 0.130 |
| 0.300 | 0.145 |
| 0.275 | 0.160 |
| 0.250 | 0.174 |
| 0.225 | 0.187 |
| 0.200 | 0.199 |
| 0.175 | 0.211 |
| 0.150 | 0.223 |
| 0.125 | 0.234 |
| 0.100 | 0.245 |
| 0.075 | 0.256 |
| 0.055 | 0.265 |
| 0.042 | 0.271 |
| 0.031 | 0.276 |
| 0.021 | 0.282 |
| 0.012 | 0.289 |
| 0.005 | 0.298 |
| 0.001 | 0.306 |

The set of points defined by the coordinates above in the Table 1 represent a novel and unique airfoil well-suited for use in the turbine section 34 of the turbine engine 26. More particularly, the set of points defined by the coordinates above in the Table 1 represent a novel and unique airfoil well-suited for use in the LPT section 34B, such as at the first stage of the LPT section 34B; e.g., in the stator vane array 72A of FIG. 2. In the first stage of the LPT, the stator vane structure 72 may include a total quantity of forty (40) of the stator vanes 82/the airfoils 84 arranged circumferentially about the axis 30 in the array.

In general, the airfoil 84 described herein has a combination of axial sweep and tangential lean. Depending on the specific configuration, lean and sweep angles sometimes vary by up to plus/minus ten degrees (+/−10°) or more. In addition, the stator vane 82 and its airfoil 84 may be rotated with respect to a radial axis or a normal line to the inner platform 78 or shroud surface, for example, by up to plus/minus ten degrees (+/−10°) or more. Novel aspects of the stator vane 82 and its exterior airfoil surface 98 described herein are achieved by substantial conformance to specified geometries. Substantial conformance generally includes or may include a manufacturing tolerance of +/−0.050 inches (+/−1.27 millimeters), in order to account for variations in molding, cutting, shaping, surface finishing and other manufacturing processes, and to accommodate variability in coating thicknesses. This tolerance is generally constant or not scalable, and applies to each of the specified stator vane surfaces, regardless of stator vane size.

Substantial conformance is based on sets of points representing a three-dimensional surface with particular physical dimensions, for example, in inches or millimeters, as determined by selecting particular values of the scaling parameters. A substantially conforming airfoil, or stator vane has surfaces that conform to the specified sets of points, within the specified tolerance.

Alternatively, substantial conformance is based on a determination by a national or international regulatory body, for example, in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, or stator vane, or that the part or structure complies with airworthiness standards applicable to the specified stator vane, or airfoil. In particular, substantial conformance encompasses any regulatory determination that a particular part or structure is sufficiently similar to, identical to, or the same as a specified stator vane, or airfoil, such that certification or authorization for use is based at least in part on the determination of similarity.

Each stator vane 82 and its airfoil 84 may be constructed from a high strength, heat resistant material such as a nickel-based or cobalt-based superalloy, or of a high temperature, stress resistant ceramic or composite material. One or more thermal barrier coatings, abrasion-resistant coatings or other protective coatings may alternatively be applied to the airfoil 84. While the airfoil 84 is generally described above as being configured without any internal cooling, it is contemplated the airfoil 84 may alternatively be modified to include one or more internal cooling passages with or without one or more cooling holes piercing the exterior airfoil surface 98.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:
- an airfoil including a first end, a second end, a leading edge, a trailing edge, a pressure side and a suction side;
- the leading edge and the trailing edge joined by the pressure side and the suction side to provide an exterior airfoil surface extending in a spanwise direction from the first end of the airfoil to the second end of the airfoil;
- the exterior airfoil surface formed in conformance with a plurality of cross-section profiles of the airfoil described by a set of Cartesian coordinates set forth in Table 1;
- the Cartesian coordinates provided by an axial coordinate scaled by a local axial chord, a circumferential coordinate scaled by the local axial chord, and a span location; and
- the local axial chord corresponding to a width of the airfoil between the leading edge and the trailing edge at the span location.

2. The apparatus of claim 1, wherein the set of Cartesian coordinates set forth in the Table 1 have a tolerance of +/−0.050 inches.

3. The apparatus of claim 1, wherein the span location corresponds to a distance from a rotational axis of the turbine engine.

4. The apparatus of claim 1, further comprising:
- an inner platform connected to the airfoil at the first end of the airfoil; and
- an outer platform connected to the airfoil at the second end of the airfoil.

5. The apparatus of claim 1, wherein the apparatus comprises a turbine vane.

6. The apparatus of claim 5, wherein the turbine vane is a low pressure turbine vane.

7. The apparatus of claim 1, further comprising a coating applied over the exterior airfoil surface.

8. The apparatus of claim 1, wherein the airfoil is configured without an internal cooling passage.

9. The apparatus of claim 1, wherein the airfoil is one of forty airfoils arranged circumferentially about an axis in an annular array.

10. A stator vane structure for a turbine engine, comprising:
- a first platform;
- a second platform; and
- a plurality of stator vanes arranged circumferentially about an axis in an array, each of the plurality of stator vanes comprising an airfoil;
- the airfoil including a leading edge, a trailing edge, a pressure side and a suction side;
- the leading edge and the trailing edge joined by the pressure side and the suction side to provide an exterior airfoil surface extending in a spanwise direction from the first platform to the second platform;
- the exterior airfoil surface formed in conformance with a plurality of cross-section profiles of the airfoil defined by a set of Cartesian coordinates set forth in Table 1;
- the Cartesian coordinates provided by an axial coordinate scaled by a local axial chord, a circumferential coordinate scaled by the local axial chord, and a span location; and the local axial chord corresponding to a width of the airfoil between the leading edge and the trailing edge at the span location.

11. The stator vane structure of claim 10, wherein the set of Cartesian coordinates set forth in the Table 1 have a tolerance of +/−0.050 inches.

12. The stator vane structure of claim 10, wherein the span location corresponds to a distance from the axis.

13. The stator vane structure of claim 10, wherein the plurality of stator vanes are turbine vanes.

14. The stator vane structure of claim 10, wherein the exterior airfoil surface is partially or completely covered by a coating.

15. The stator vane structure of claim 10, wherein the plurality of stator vanes consist of forty stator vanes.

16. A turbine engine, comprising:

a flowpath, a compressor section, a combustor section and a turbine section;

the flowpath extending through the compressor section, the combustor section and the turbine section from an inlet into the flowpath to an exhaust from the flowpath;

the turbine section including a plurality of turbine vanes arranged circumferentially about an axis in an array, each of the plurality of turbine vanes comprising an airfoil located in the flowpath;

the airfoil including a first end, a second end, a leading edge, a trailing edge, a pressure side and a suction side;

the leading edge and the trailing edge joined by the pressure side and the suction side to provide an exterior airfoil surface extending in a spanwise direction from the first end of the airfoil to the second end of the airfoil;

the exterior airfoil surface formed in conformance with a plurality of cross-section profiles of the airfoil defined by a set of Cartesian coordinates set forth in Table 1;

the Cartesian coordinates provided by an axial coordinate scaled by a local axial chord, a circumferential coordinate scaled by the local axial chord, and a span location; and the local axial chord corresponding to a width of the airfoil between the leading edge and the trailing edge at the span location.

17. The turbine engine of claim 16, wherein the turbine section includes a high pressure turbine section and a low pressure turbine section, and the low pressure turbine section includes the plurality of turbine vanes.

18. The turbine engine of claim 17, wherein the plurality of turbine vanes are part of a first stage of the low pressure turbine section.

19. The turbine engine of claim 17, wherein the set of Cartesian coordinates set forth in the Table 1 have a tolerance of +/−0.050 inches.

20. The turbine engine of claim 17, further comprising a coating applied over the exterior airfoil surface.

* * * * *